No. 763,606. PATENTED JUNE 28, 1904.
C. F. HETTINGER.
COMBINED BREWING KETTLE, HOP-JACK TANK, AND COOKER.
APPLICATION FILED FEB. 10, 1904.
NO MODEL. 3 SHEETS—SHEET 1.
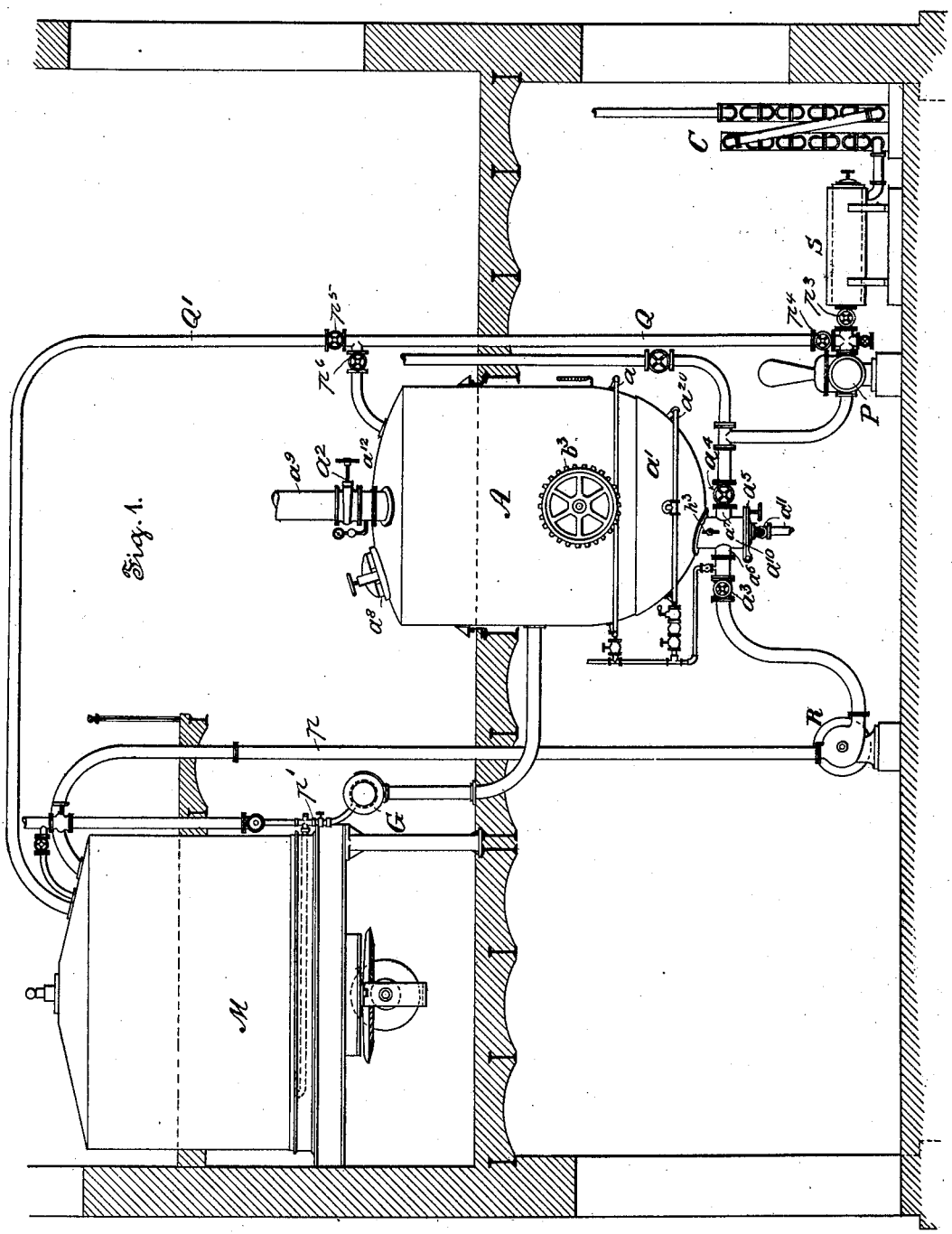
Witnesses:
H. W. Bormann
G. Hesse.
Inventor:
Carl F. Hettinger.
By Hermann Bormann
Att'y.

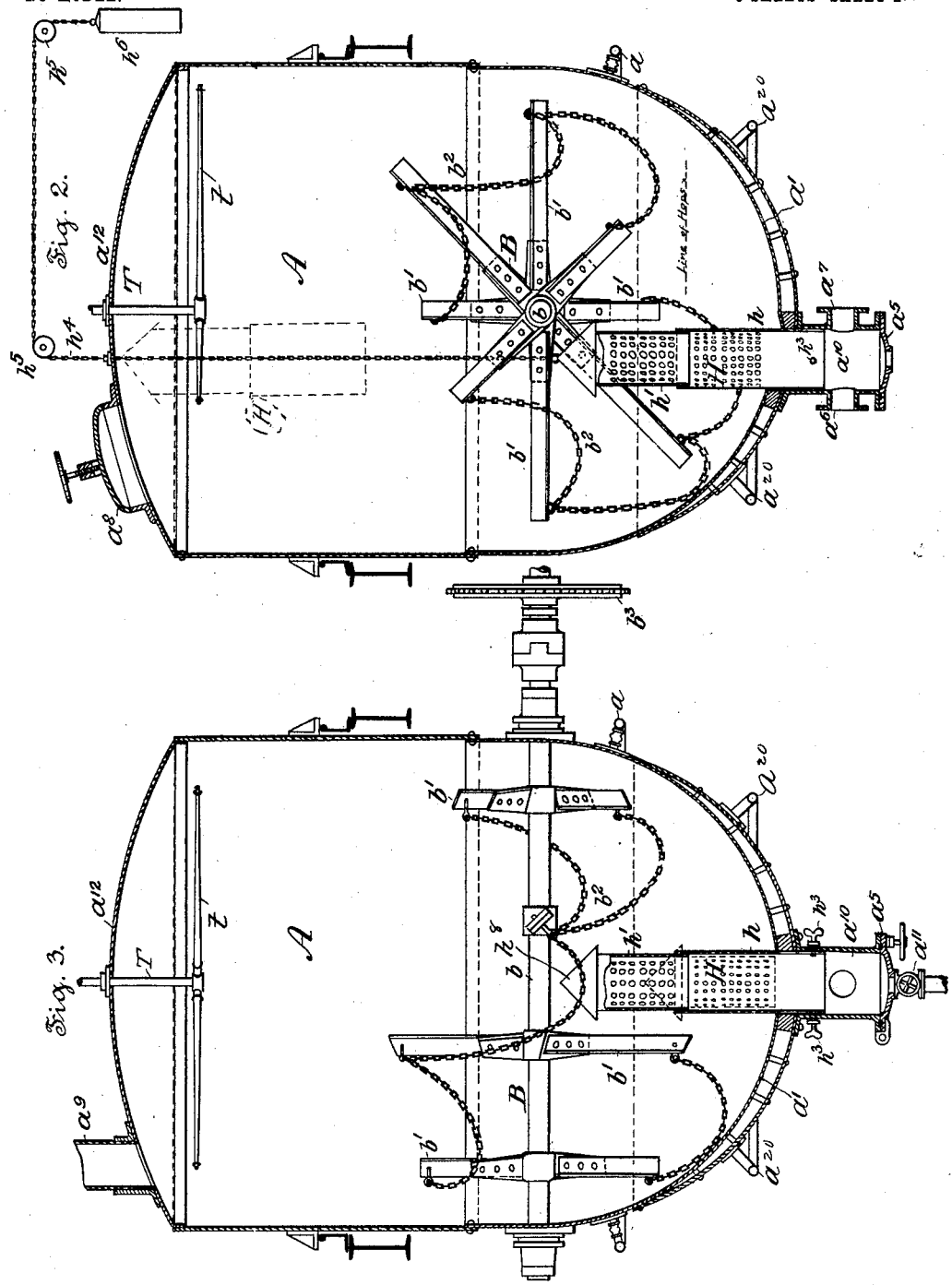

No. 763,606. PATENTED JUNE 28, 1904.
C. F. HETTINGER.
COMBINED BREWING KETTLE, HOP-JACK TANK, AND COOKER.
APPLICATION FILED FEB. 10, 1904.
NO MODEL. 3 SHEETS—SHEET 3.
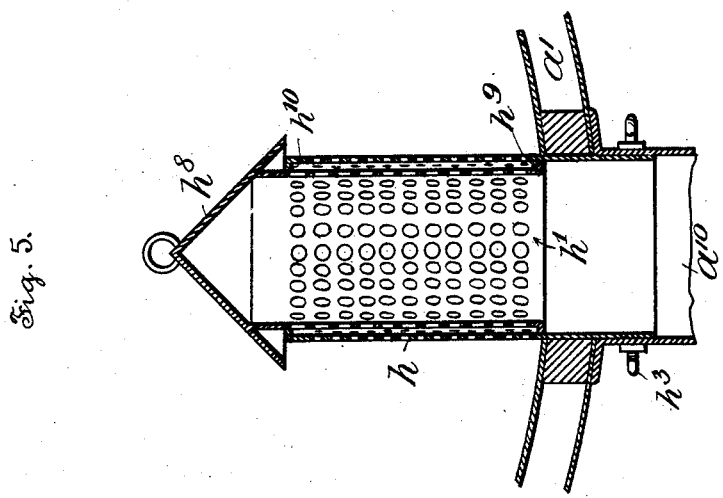
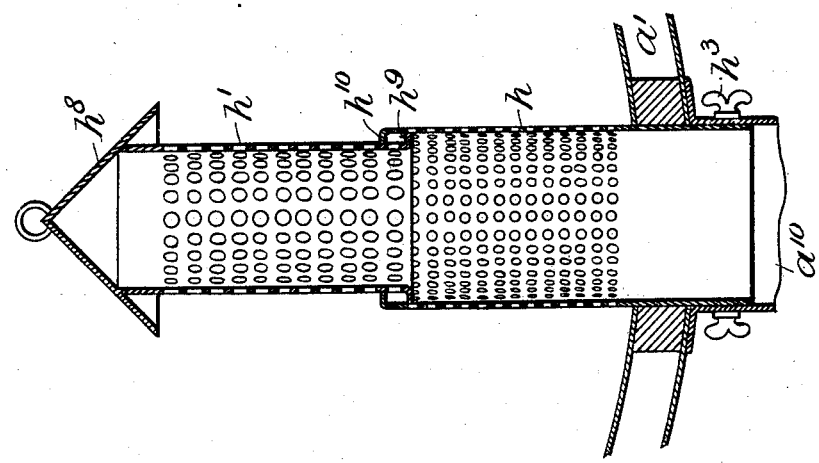
Witnesses:
Hermann W. Bormann
O. Bormann
Inventor:
Carl F. Hettinger
By Hermann Bormann
Atty.

UNITED STATES PATENT OFFICE.

CARL F. HETTINGER, OF BOSTON, MASSACHUSETTS.

COMBINED BREWING-KETTLE, HOP-JACK TANK, AND COOKER.

SPECIFICATION forming part of Letters Patent No. 763,606, dated June 28, 1904.

Application filed February 10, 1904. Serial No. 192,889. (No model.)

*To all whom it may concern:*

Be it known that I, CARL F. HETTINGER, a citizen of the United States, residing at Boston, in the county of Suffolk and State of Massachusetts, have invented new and useful Improvements in a Combined Brewing-Kettle, Hop-Jack Tank, and Cooker, of which the following is a specification.

My invention relates to brewing-kettles used in the preparation of malt liquors, and has for its object to provide a brewing-kettle which may be converted alternately into a cooker or a hop-jack tank without interfering in the least with the continuous process in the preparation of malt liquors.

My improved apparatus or kettle being first used as a cooker, the ingredients are treated therein as hereinafter described, and the mass is then conveyed into the usual mash-tub for further treatment, and while the mass is treated and supplemented in the mash-tub the brewing-kettle is cleaned for the reception of the wort from the mash-tub. A hop-strainer is then put into position in the kettle, so that after the wort has been boiled hops may be added to the wort in the kettle and the latter be used as a hop-jack tank, as will be hereinafter fully described.

The principal object of my invention is to provide one apparatus to serve the purposes and functions of three apparatus, with better results, less work in cleaning, &c., and whereby not only a material saving in the cost of installation of a brewery is gained, but also the space occupied by such apparatus may be used for other purposes or the building may be made so much smaller.

My improved combined cooker, brewing-kettle, and hop-jack tank consists of a vessel, an agitator therein, a removable telescoping hop-strainer, means for removing the same, a clean-out in the bottom of said vessel, and means for heating the latter; and my invention further consists of the improvements hereinafter more fully described, and pointed out in the claims.

My invention will be more fully understood taken in connection with the accompanying drawings, forming part hereof, and in which—

Figure 1 is a view showing the arrangement of my combined cooker, brewing-kettle, and hop-jack tank with regard to the usual mash-tub, coolers, &c., and necessary pump for forcing the mass from the cooker into the mash-tub and a pump for forcing the liquid from the brewing-kettle to and through the cooler. Fig. 2 is a vertical section through my combined cooker, brewing-kettle, and hop-jack tank, showing the agitator and the hop-strainer in position on the bottom of the vessel. Fig. 3 is a similar section to Fig. 2, but being taken on a line ninety degrees from that on which Fig. 2 is taken and showing the hop-strainer in full lines on the bottom of the vessel and in dotted lines in elevated position. Fig. 4 is a sectional elevation of the telescopic hop-strainer, showing the two sections in a drawn-out position; and Fig. 5 is a similar view to Fig. 4, showing the hop-strainer closed or pushed together.

Referring now to the drawings for a further description of my invention, and especially to Figs. 2 and 3, A is a vessel with a direct steam-heating-supply pipe $a$ and a steam-jacketed bottom $a'$, provided with the steam-supply pipes $a^{20}$. The vessel A is covered with a top $a^{12}$, provided with a manhole $a^8$, a vapor-offtake $a^9$, and a valve $a^2$ in said offtake, Fig. 1, to render the vessel practically air-tight for a purpose to be described. T is a water-supply pipe with branches $t$ for sparging hot or cold water over the contents of the vessel whenever the process of brewing or cooking requires a supply of water. In the steam-jacketed bottom $a'$ is provided a clean-out, consisting of a three-way outlet $a^{10}$, the vertical branch of which is fitted with a trap or swinging door $a^5$ and the branches $a^6$ and $a^7$ with valves $a^3$ and $a^4$, Figs. 1, 2, and 3, for purposes to be described. The trap or swinging door $a^5$ may be provided with a wash-out pipe and valve $a^{11}$ and may lead either directly to a sewer or to another suitable conduit or offtake. The vessel A is provided with an agitator B of any preferred construction. The one shown in Figs. 2 and 3 comprises a shaft $b$, having blades $b'$ and chains $b^2$, and is driven from any suitable source by the sprocket-wheel $b^3$.

Over the clean-out and three-way outlet $a^{10}$ is fitted a removable hop-strainer H, comprising the sections $h$ and $h'$, the lower section $h$ of which is provided with a suitable device for removably attaching the same to the outlet $a^{10}$. In the drawings hand-screws $h^3$ are shown for this purpose; but any other device may be designed to effectively hold the lower section $h$ in place. The upper section $h'$ is fitted to slide inside the lower one and is provided with a flange $h^9$, adapted to abut against the flange $a^{10}$ of the lower section $h$ when the two sections are drawn apart and to prevent disengagement of the said sections. The upper section $h'$ is provided with a hood $h^8$, and a chain $h^4$ is fastened to said hood and led through an opening in the cover $a^{12}$ of the vessel A and over the pulleys $h^5$, so that the entire hop-strainer H may be elevated by means of the counterweight $h^6$ to the top of the vessel A, as shown in dotted lines in Fig. 2, or the upper section $h'$ may be drawn out from the lower section $h$, as shown in full lines in Figs. 2, 3, and 4, for purposes to be described. The lower section $h$ is provided with small perforations and the upper section $h'$ with larger ones for purposes to be more fully described.

The operation of my improved combined cooker, brewing-kettle, and hop-jack tank in conjunction with the necessary mash-tub, pumps, coolers, and other adjuncts is as follows: The brewing-kettle A will first be used as a cooker, in which capacity no hop-strainer H is needed, and the latter is therefore elevated to the top of the vessel and held there by the counterweight $h^6$, Fig. 2. Malt and water at a temperature of 120° Fahrenheit is then admitted into the vessel A, and the agitator is set in motion to stir the mass. The valve $a^2$ is closed, and heat is supplied by the direct steam-pipe $a$ and the steam-jacketed bottom $a'$ to raise the temperature of the mass to 167° Fahrenheit. After obtaining this temperature cereals will be added to the mash and the contents of the vessel will be brought to the boiling-point under continuous stirring and be boiled or cooked for about thirty minutes. The valve $a^2$ is then opened to relieve the vessel A of pressure. The steam is then turned off and the valve $a^3$ is opened, so that the whole mass can be forced, by means of the rotary or other pump R and pipe $p$, into the mash-tub M and on top of the mash contained therein, which thereby attains a temperature of 167° Fahrenheit, and by letting the mash rest in the tub M for about one hour the malt is inverted into malto-dextrin and sugar. While this inversion is going on, the vessel A is thoroughly cleaned, the agitator B is kept at rest, and the telescopic hop-strainer H is lowered and put in position as shown in full lines in Figs. 2 and 3, with the upper section $h'$ lowered, as shown in Fig. 5, the lower section $h$ being held in place on the outlet $a^{10}$ by the hand-screws $h^3$. The valves $a^3$, $a^{11}$, and $a^4$ are then closed, and wort is drawn from the mash-tub M by the pipe $p'$ through the grant G into the kettle A, in which it will be boiled. Water at the temperature of 167° Fahrenheit will be sparged over the contents of the mash-tub M, and the resulting wort will also be drawn into the vessel A until a desired quantity is contained therein. The wort in the vessel A is then boiled until the undesirable albuminoids are partly precipitated and the wort attains clearness and transparency. To insure a uniform boiling of the wort in the kettle and also that contained in and around the hop-strainer H, which may have been lying idle and not boiled thoroughly, part of the wort is drawn from the bottom of the vessel A by closing the valves $p^3$ and $p^5$, Fig. 1, and opening the valves $a^4$, $p^4$, and $p^6$ and starting the pump P. The boiling of the wort being completed with satisfactory results, the hops will be added to the wort contained in the vessel A, and the boiling of the wort with the hops will be continued until the desired gravity of the wort is obtained. Then all the heat will be stopped off and the boiling discontinued. The hops are then allowed to settle, and the top thereof will reach about the height indicated by the "line of hops" in Fig. 2, or rather lower than the top of the lower section $h$ of the hop-strainer H. The upper section $h'$ of the hop-strainer is then raised to the position as shown in Figs. 2, 3, and 4, so that the large perforations of the section $h'$ are presented to the liquid above the line of hops, and the wort or beer may be drawn off quickly from the vessel A by closing the valve $p^4$, opening the valves $a^4$ and $p^3$, and starting the pump P, which forces the beer through a second strainer S into a double-pipe cooler C and from here to the fermenting-tubs. (Not shown.) The strainer S is provided to retain all particles of hops and impurities which may have passed the hop-strainer H in the vessel A. The double-pipe cooler C is arranged to convey the beer in the inside pipe and the cooling agent in the outside pipe to quickly reduce the temperature of the beer, so as to be suitable for the fermenting-tubs. After the beer is drawn from the vessel A the vessel and hop-strainer H are cleaned thoroughly and the latter detached from the bottom of the vessel and elevated to the top thereof, the hops being removed by opening the trap or swinging door $a^5$.

If preferred, the pump R may be dispensed with and the pump P may be used for forcing the mash from the vessel A (when used as a cooker) to the mash-tub M by opening the valves $a^4$, $p^4$, and $p^5$, Fig. 1, and closing the valves $p^3$ and $p^6$. The mash will then pass through the pump P when in operation and the pipes Q and Q'.

While I have shown and described certain apparatus in connection with my combined cooler, brewing-kettle, and hop-jack tank, I wish it to be understood as not limiting myself to the exact types and arrangements of such apparatus as shown, and even the arrangement and construction of the hop strainer and agitator may be altered without departing from the spirit of my invention, and,

Having thus described the nature and objects of my invention, what I claim as new, and desire to secure by Letters Patent, is—

1. The combination with a brewing-kettle, of a clean-out in the bottom thereof and located at its lowest part and of a telescoping hop-strainer removably attached to and directly over said clean-out substantially as and for the purposes set forth.

2. The combination with a brewing-kettle, of means for heating the same, a clean-out in the bottom thereof and located at its lowest point, a telescoping hop-strainer arranged directly over the clean-out and means for removably attaching said hop-strainer to said clean-out from the outside of the kettle, substantially as and for the purposes set forth.

3. The combination with a brewing-kettle, of means for heating the same, a clean-out in the bottom thereof, a telescoping hop-strainer arranged directly over the clean-out, means for removably attaching said hop-strainer to said clean-out, and outlet and a valve on said clean-out to lead the contents of the kettle to either a mash-tub or through a second strainer into a beer-cooler, substantially as and for the purpose set forth.

4. A vessel adapted to be used as a cooker, brewing-kettle, and hop-jack tank, an agitator therein, a removable telescoping hop-strainer suspended in said vessel, means for securing said strainer to the bottom of said vessel, means for elevating said strainer, a clean-out in the bottom of said vessel, an outlet and a valve on said clean-out, to lead the contents of the vessel to either a mash-tub or through a second strainer into a beer-cooler substantially as and for the purposes set forth.

In witness whereof I have hereunto set my hand in the presence of two subscribing witnesses.

CARL F. HETTINGER.

Witnesses:
   CHAS. LEFFLER,
   ISAAC R. WHEELOCK.